United States Patent
Seuser et al.

(10) Patent No.: US 6,513,818 B1
(45) Date of Patent: Feb. 4, 2003

(54) ASSEMBLY FOR VEHICLE SUSPENSION SYSTEM

(75) Inventors: Ulrich H. Seuser, Neuwied (DE); Juergen Daams, Stolberg (DE); Clive J. Spackman, Novi, MI (US)

(73) Assignees: TRW Inc., Lyndhurst, OH (US); Lucas Automotive GmbH, Koblenz/Rheinland Pfalz (DE)

( * ) Notice: Subject to any disclaimer, the term of this patent is extended or adjusted under 35 U.S.C. 154(b) by 0 days.

(21) Appl. No.: 09/709,008

(22) Filed: Nov. 8, 2000

(51) Int. Cl.[7] .................................................. B62D 7/18
(52) U.S. Cl. ..................... 280/93.512; 280/124.125; 280/781
(58) Field of Search ................... 280/124.125, 124.126, 280/781, 93.512

(56) References Cited

U.S. PATENT DOCUMENTS

| | | | | |
|---|---|---|---|---|
| 4,813,704 A | * | 3/1989 | Smith ................... | 280/124.109 |
| 5,538,274 A | * | 7/1996 | Schmitz et al. .......... | 267/141.2 |
| 5,557,961 A | | 9/1996 | Ni et al. | |
| 5,564,785 A | | 10/1996 | Schultz et al. | |
| 5,662,349 A | | 9/1997 | Hasshi et al. | |
| 5,673,929 A | | 10/1997 | Alatalo | |
| 5,782,484 A | * | 7/1998 | Kuhn, Jr. .................... | 267/248 |
| 5,799,524 A | | 9/1998 | Schafer et al. | |
| 5,938,219 A | * | 8/1999 | Hayami et al. ....... | 280/124.135 |
| 6,006,568 A | * | 12/1999 | Bihrer ........................ | 29/421.1 |
| 6,070,445 A | | 6/2000 | Holierhoek | |
| 6,098,437 A | | 8/2000 | Kocer et al. | |

OTHER PUBLICATIONS

Article entitled "Hydro–Forming is Hot", by Christopher A. Sawyer, Automotive Industries, Jun., 1991.
Article in Hydroforming.net News entitled "Steel refuses to bend before aluminum's challenge", News Date Aug. 14, 2000–Sep. 5, 2000, Copyright 1998–2000.
Brochure by Schuler Hydroforming, Technologie & Unternehmen, publication date unknown, but prior to Oct. 17, 2000.

* cited by examiner

Primary Examiner—Paul N. Dickson
Assistant Examiner—Toan C To
(74) Attorney, Agent, or Firm—Tarolli, Sundheim, Covell, Tummino & Szabo L.L.P.

(57) ABSTRACT

An assembly (20) for use in a vehicle suspension system for connection with a wheel (14) of a vehicle includes first and second hollow hydroformed sections (42 and 44). In one embodiment of the assembly (20), upper and lower pivot mountings (110 and 68) are connected with the hollow hydroformed sections (42, 44). A wheel mounting section (24) is pivotally connected with the upper and lower pivot mountings (110 and 68). The pivot mountings (110, 68) allow the steerable vehicle wheel (14) to be turned to effect steering of a vehicle (10). The assembly (20) may be utilized in association with a vehicle wheel (16) which is not steerable. When the assembly is utilized in the vehicle wheel (16) which is not steerable, the pivotal wheel mounting section (24) may be eliminated.

31 Claims, 3 Drawing Sheets

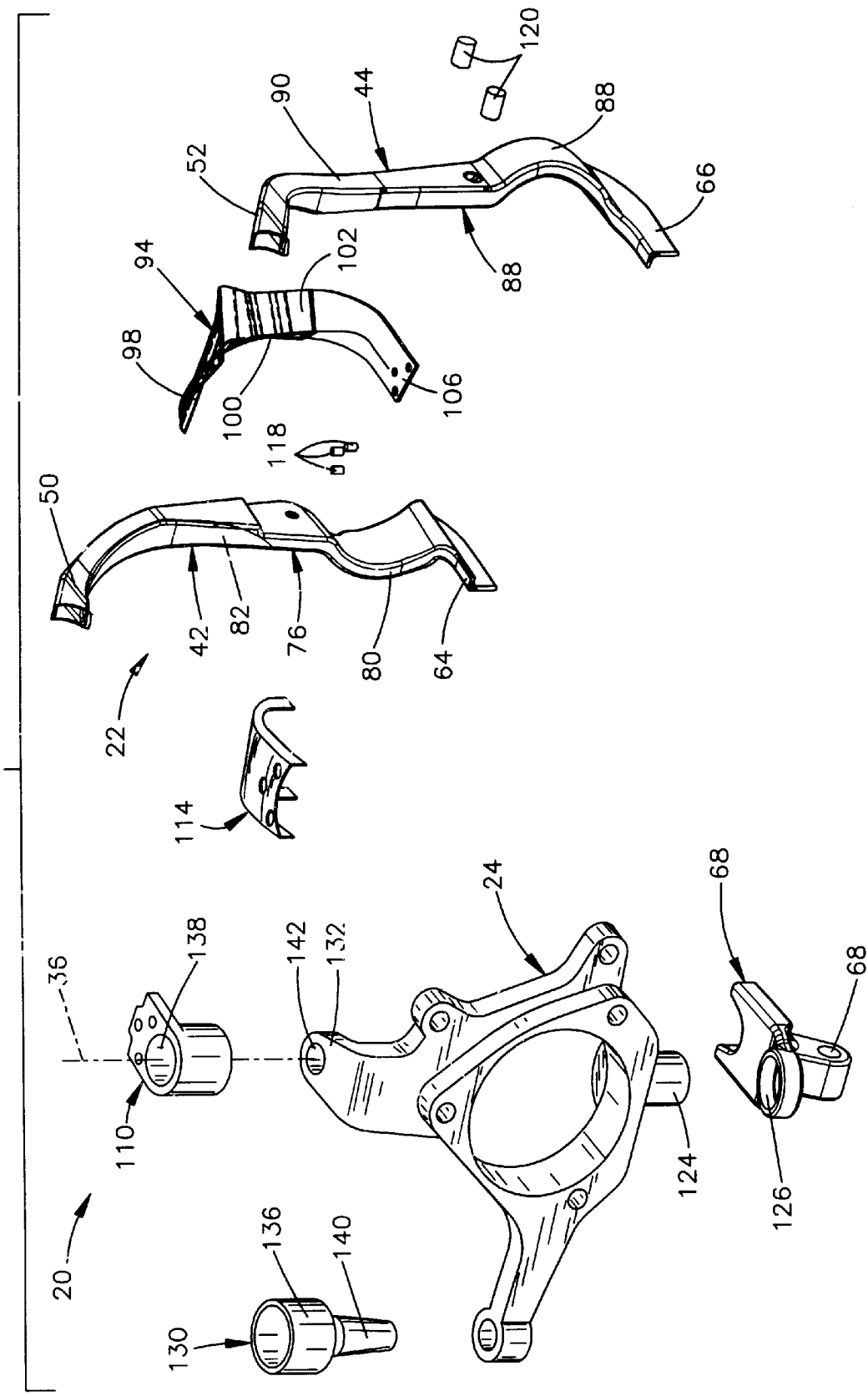

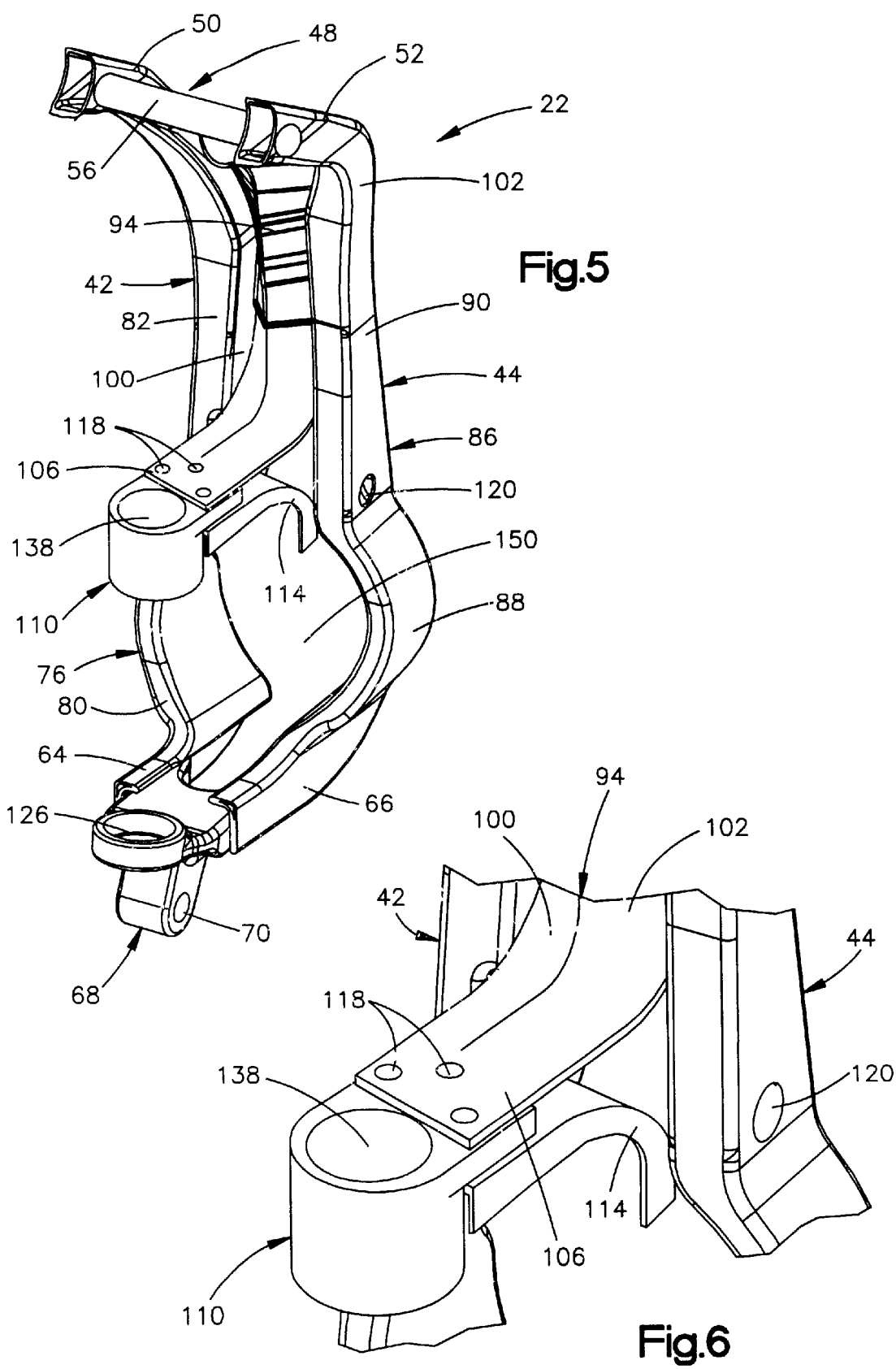

ASSEMBLY FOR VEHICLE SUSPENSION SYSTEM

BACKGROUND OF THE INVENTION

The present invention relates to a new and improved assembly for use in a vehicle suspension system in association with a wheel of the vehicle. The assembly includes one or more hydroformed components.

Vehicle suspension systems have commonly included a hub which is connected with either a front or a rear wheel of the vehicle. When the vehicle wheel is a steerable front wheel, the hub may be connected with a steering knuckle, that is, a wheel mounting section. The steering knuckle is pivotal about a steering axis to effect,the turning movement of the steerable vehicle wheel. Non-steerable vehicle wheels, typically the rear wheels, are connected with hubs which are not mounted on a pivotal steering knuckles.

It is desirable to minimize the weight of components of a vehicle suspension system. It is also desirable to have the components of the vehicle suspension system constructed in such a manner as to enable them to be modified for use in association with either steerable or non-steerable wheels of a vehicle. It is believed that hydroforming may advantageously be utilized to form components of a vehicle suspension system. Hydroformed components of vehicle suspension systems are disclosed in U.S. Pat. Nos. 6,070,445 and 6,098,437.

SUMMARY OF THE INVENTION

In accordance with the present invention, an assembly for use in a vehicle suspension system includes first and second hollow hydroformed sections. A wheel mounting section is connected with the hydroformed sections. The hydroformed sections are connectable with other components of the vehicle.

When the hydroformed sections are utilized in association with a steerable wheel of a vehicle, upper and lower pivot mountings may be connected with the hydroformed sections. The wheel mounting section is connected with the upper and lower pivot mountings and is connected with the steerable wheel of the vehicle.

The steerable wheel of the vehicle may be connected with a wheel mounting section which is pivotal relative to the hollow hydroformed sections. Alternatively, the hollow hydroformed sections may be pivotal with the wheel mounting section.

When the assembly is to be utilized in association with a vehicle wheel which is not steerable, the pivot mountings may be omitted and the wheel mounting section connected with the hydroformed sections. If desired, the pivot mountings may be omitted and the wheel mounting section connected with the hydroformed sections when the assembly is utilized in association with a steerable vehicle wheel. If this was done, the hydroformed sections would be pivotal together relative to other components of the vehicle to accommodate turning movement of the steerable vehicle wheel.

BRIEF DESCRIPTION OF THE DRAWINGS

The foregoing and other features of the invention will become more apparent upon a consideration of the following description taken in connection with the accompanying drawings wherein:

FIG. 4 is an exploded view of components of the wheel suspension assembly of FIGS. 2 and 3;

FIG. 5 is an enlarged pictorial illustration, generally similar to FIG. 2, of a carrying assembly which forms part of the wheel suspension assembly of FIGS. 2 and 3; and, FIG. 6 is an enlarged fragmentary pictorial illustration of an upper pivot mounting which forms part of the carrying assembly of FIG. 5.

DESCRIPTION OF SPECIFIC PREFERRED EMBODIMENTS OF THE INVENTION

Figure 1:
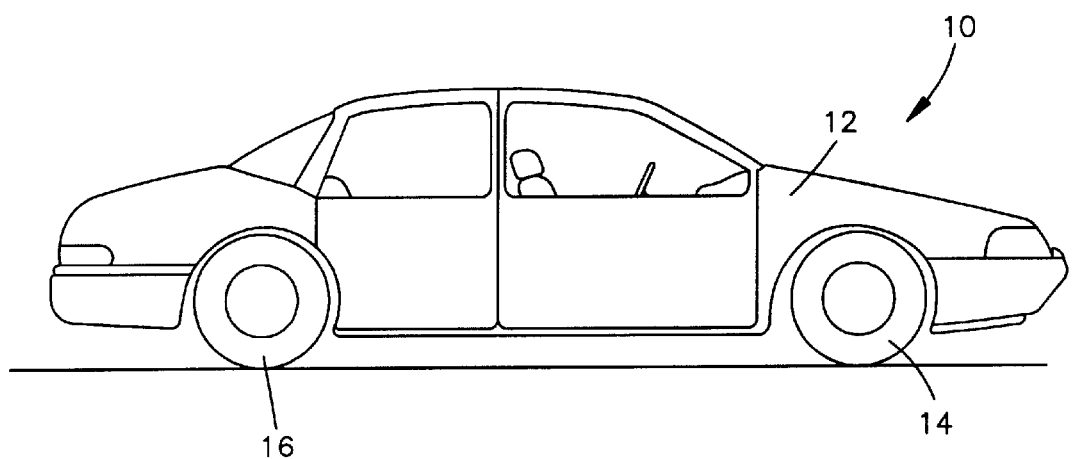
FIG. 1 is a schematic illustration of a vehicle.

A vehicle 10 (FIG. 1) includes a body 12 having a frame (not shown) which is connected with front and wheel rears 14 and 16 by a suspension system. The front wheel 14 can be turned by a vehicle steering system to change the direction of movement of the vehicle 10. However, the rear wheels 16 cannot be turned to change the direction of movement of the vehicle.

Figures 2, 3:
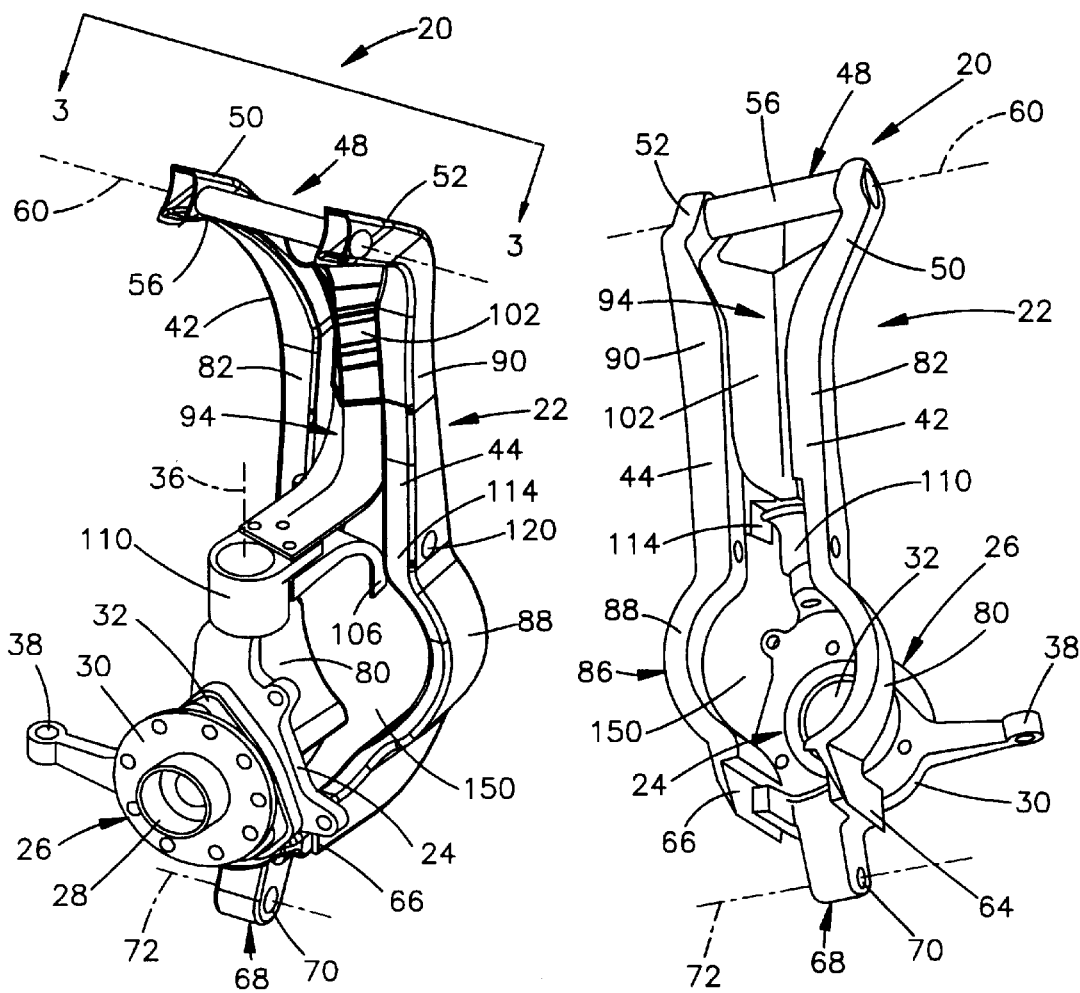
FIG. 2 is a pictorial illustration of a wheel suspension assembly for a steerable wheel of the vehicle of FIG. 1.
FIG. 3 is a pictorial illustration, taken generally along the line 3—3 of FIG. 2.

The front wheel 14 of the vehicle 10 is connected with the frame and body 12 of the vehicle by a wheel suspension assembly 20 (FIGS. 2 and 3). The wheel suspension assembly 20 includes a carrying assembly 22. A wheel mounting or knuckle section 24 is pivotably mounted on the carrying assembly 22. A hub 26 is rotatably mounted on the wheel mounting section 24. The hub 26 is fixedly connected with the steerable front wheel 14.

The hub 26 has a cylindrical drive section 28 (FIG. 2) which is internally splined and is connectable with a drive shaft. The hub 26 also has an annular flange 30 which is fixedly connected with the front wheel 14 of the vehicle. The drive section 28 is driven by a drive shaft (not shown) to rotate the front wheel 14 during operation of the vehicle 10. The hub 26 is supported for rotation relative to the wheel mounting section 24 by a bearing assembly 32 (FIG. 3).

The wheel mounting section 24 (FIGS. 2 and 3) is pivotal relative to the carrying assembly 22 about a steering axis 36 (FIG. 2) during turning movement of the steerable front wheel 14. The wheel mounting section 24 has an outwardly extending arm 38 which is connected with a vehicle steering system to effect turning movement of the steerable vehicle wheel 14 in response to rotation of a steering wheel. If desired, the wheel mounting section 24 could be fixedly secured to the carrying assembly 22 and the carrying assembly mounted for pivotal movement about the steering axis 36.

The various components of the wheel suspension assembly 20 are illustrated in FIG. 4. Thus, the wheel suspension assembly 20 includes the carrying assembly 22 and the wheel mounting section 24. The wheel mounting section 24 is pivotally mounted on the carrying assembly 22 for pivotal movement about the steering axis 36 (FIG. 2). The hub 26 is pivotal with the wheel mounting section 24 about the steering axis 36.

The carrying assembly 22 includes a hollow rear hydroformed frame section 42 and a hollow front hydroformed frame section 44. When the wheel suspension assembly 20 is installed in a vehicle 10 (FIG. 1), the front frame section 44 (FIG. 4) is disposed ahead of the rear frame section 42 during forward movement of the vehicle 10. The wheel mounting section 24 is pivotally supported on the rear frame section 42 and front frame section 44.

The rear frame section 42 and front frame section 44 may be considered as columns between which necessary suspension apparatus is mounted. An analogy may be made to a ladder. The rear frame section 42 and front frame section 44 may be considered as the long side pieces of the ladder and wheel mounting components considered as cross pieces which extend between the side pieces. This construction enables the carrying assembly 22 to be readily modified to form a wheel suspension assembly for use in many different types of vehicle suspensions.

An upper pivot mounting section 48 (FIGS. 2 and 3) forms part of the wheel suspension assembly 20. The upper pivot mounting section 48 is fixedly connected to upper end portions SO and 52 (FIGS. 2 and 4) of the front and rear frame sections 42 and 44. The upper pivot mounting section 48 (FIG. 2) is pivotally connected with components connected to the frame of the vehicle, that is, to an upper control arm. The upper pivot mounting section 48 includes a cylindrical tubular housing 56 in which suitable bushings (not shown) are disposed. The wheel suspension assembly 20 is supported by the upper pivot mounting section 48 for pivotal movement about a mounting axis 60 which extends transverse to the steering axis 36 about which the wheel mounting section 24 is pivotal.

The front and rear frame sections 42 and 44 of the carrying assembly 22 (FIGS. 2 and 4) have lower end portions 64 and 66 (FIG. 4) which are connected to a lower pivot mounting section 68. The lower pivot mounting section 68 is a one-piece cast metal member which is pivotally connected with components of the vehicle 10. Thus, the lower pivot mounting section 68 has a lower mounting section 70 which is connected with a lower control arm which is pivotally connected with the frame of a vehicle. The lower pivot mounting section 68 is pivotal about a mounting axis 72 which extends generally parallel to the upper mounting axis 60 and perpendicular to the steering axis 36. The upper and lower control arms cooperate with the upper pivot mounting section 48 and lower pivot mounting section 68 to maintain the front wheel 14 (FIG. 1) of the vehicle in a desired orientation relative to the road when the wheel encounters a bump or a depression in the road.

In addition to the upper and lower end portions 50 and 64, the rear frame section 42 (FIG. 4) includes a main section 76 which is integrally formed as one piece with the upper end portion 50 and lower end portion 64 of the rear frame section 42. The main section 76 includes an arcuate section 80 and a connector section 82. The arcuate section 80 extends upward (as viewed in FIG. 4) from the lower end portion 64 of the rear frame section 42 and has an arcuate configuration with a center of curvature which is disposed between the front and rear frame sections 42 and 44. The connector section 82 has a generally linear configuration and extends upward from the arcuate section 80 to the upper end portion 50 of the rear frame section 42.

Similarly, the front frame section 44 (FIG. 4) includes a main section 86 which is integrally formed as one piece with the upper end portion 52 and lower end portion 66 of the front frame section. The main section 86 includes an arcuate section 88 and a connector section 90. The arcuate section 88 has a center of curvature which is disposed between the rear frame section 42 and front frame section 44. The connector section 90 extends between the arcuate section 88 and the upper end portion 52 of the front frame section 44. The connector section 90 is integrally formed as one piece with the arcuate section 88 and the upper and lower end portions 52 and 66 of the front frame section 44.

The rear frame section 42 and front frame section 44 are advantageously hydroformed from tubular metal members which, initially, are cylindrical and have a linear configuration. However, it should be understood that the tubular members from which the rear frame section 42 and the front frame section 44 are formed could have different initial configurations if desired.

The tubular metal members from which the rear frame section 42 and front frame section 44 are formed are first shaped and bent with dies in a hydroforming press. The tubular members are then filled with hydraulic fluid and are formed under the influence of hydraulic fluid pressure and dies which engage the exterior of the tubular members. The manner in which the rear frame section 42 and front frame section 44 are shaped to the configuration illustrated in FIGS. 2 and 4 by a hydroforming operation is well known to those skilled in the art and is similar to that described in U.S. Pat. Nos. 5,557,961 and 6,098,437.

By hydroforming the rear frame section 42 and front frame section 44, the frame sections are each integrally formed as one piece. The upper end portions 50 and 52, connector sections 82 and 88, and arcuate sections 80 and 86 of the rear frame section 42 and front frame section 44 are hollow and have a generally rectangular configuration as viewed in planes extending perpendicular to longitudinal central axis of each of the sections. However, it is contemplated that the rear frame section 42 and front frame section 44 could have cross sectional configurations other than the illustrated rectangular cross sectional configuration.

The lower end portions 64 and 66 of the front and rear frame sections 42 and 44 are flattened so as to have a solid cross-sectional configuration by dies in the hydroforming press and are not hollow. Although the rear frame section 42 and front frame section 44 are not hollow throughout their entire length, the rear and front frame sections are hollow throughout the majority of their length and are hydroformed to have a desired cross-sectional configuration. By making the rear frame section 42 and front frame section 44 hollow, the overall weight of the rear frame section 42 and front frame section 44 tends to be minimized. By hydroforming the rear frame section 42 and front frame section 44, they are formed to have the strength required to withstand loads to which they are subjected during operation of the vehicle 10.

A one-piece sheet metal reinforcing member 94 (FIGS. 2 and 4) extends between the rear and front frame sections 42 and 44 of the carrying assembly 22. The reinforcing member 94 has an upper end portion 98 (FIG. 4) which is fixedly connected, specifically welded, to the housing 56 (FIGS. 1 and 2) of the upper pivot mounting section 48. The reinforcing member 94 is formed as one piece and has a longitudinally extending side section 100 (FIG. 4) which is welded to the connector section 82 of the rear frame section 42. Similarly, the reinforcing member 94 has a longitudinally extending side section 102 which is welded to the connector section 90 of the front frame section 44. The reinforcing member 94 also has an outwardly projecting arm 106 which extends transverse to the side sections 100 and 102.

The wheel mounting section 24 (FIG. 4) is integrally cast as one-piece of metal. The wheel mounting section 24 is pivotally connected with the lower pivot mounting section 68 and an upper wheel pivot mounting section 110. The upper wheel pivot mounting section 110 is a one-piece cast metal member.

The upper wheel pivot mounting section 110 is offset outward from the connector sections 82 and 90 of the rear frame section 42 and front frame section 44 (FIG. 2). The upper wheel pivot mounting section 110 is disposed between the lower pivot mounting section 68 and the upper pivot mounting section 48 for the carrying assembly 22. The upper wheel pivot mounting section 110 is fixedly connected to the arm 106 of the reinforcing member 94.

A support member 114 (FIGS. 2, 3 and 4) is formed from one piece of sheet metal. The support member 114 interconnects the upper wheel mounting section 110 with the connector sections 82 and 90 of the rear frame section 42 and front frame section 44. The arm 106 on the reinforcing member 94 (FIG. 4) is connected with the upper side of the upper wheel pivot mounting section 110 (FIGS. 5 and 6) while the support member 114 is connected with a lower portion of the upper wheel pivot mounting section. Rivets 118 (FIGS. 4–6) extend through the arm 106, the upper wheel pivot mounting section 110, and the support member 114 to fixedly interconnect them.

The support member 114 is connected with the rear frame section 42 and front frame section 44 by rivets 120. This results in the upper wheel mounting section 110 being supported in a spaced apart relationship with the lower mounting section 68. The axis 36 (FIG. 2) extends through the lower pivot mounting section 68 and the upper wheel pivot mounting section 110.

The wheel mounting section 24 is disposed between and is pivotally connected width, the lower pivot mounting section 68 and upper wheel pivot mounting section 110 (FIG. 2). The wheel mounting section 24 has a downwardly (as viewed in FIG. 4) extending cylindrical pin 124 which extends into a cylindrical opening 126 in the lower pivot mounting section 68. The pin 124 is pivotally mounted in the opening 126 to enable the wheel mounting section 24 to be pivoted relative to the lower pivot mounting section 68 by the application of force to the arm 38 of the wheel mounting section.

In the illustrated embodiment of the carrying assembly 44, a ball joint assembly 130 (FIG. 4) is provided to interconnect an upwardly extending flange 132 on the wheel mounting section 24 and the upper wheel pivot mounting section 110. The ball joint assembly 130 has a cylindrical housing 136 which is received in a cylindrical opening 138 in the upper wheel pivot mounting section 110. The housing 136 is fixedly connected with the upper wheel pivot mounting section 110.

A shank portion 140 of a ball stud of the ball joint assembly 130 extends downward (as viewed in FIG. 4) into a circular opening 142 in the flange 132 of the wheel mounting section 24. The shank portion 140 of the ball joint assembly 130 may be axially tapered and the opening 142 may have a similar axially tapering configuration. The axis 36 extends through centers of the openings 126, 138 and 142.

The ball joint assembly 130 is connected between the upper wheel pivot mounting section 110 and the wheel mounting section 124 in the same manner as is disclosed in U.S. Pat. No. 6,042,294. The ball joint assembly 130 may have any desired construction, including the constructions illustrated in the aforementioned U.S. Pat. No. 6,042,294. For example, the ball joint assembly 130 could have a construction similar to the construction of any one of the ball joints illustrated in U.S. Pat. Nos. 5,286,131 and 5,765,844 if desired. of course, the ball joint assembly 130 could have a construction different than the construction in any of the aforementioned patents.

When the rear frame section 42, front frame section 44, reinforcing member 94, upper wheel pivot mounting section 110, support member 114 and lower pivot mounting 68 are interconnected in the manner illustrated in FIG. 5, the carrying assembly 22 is complete. There is a generally circular opening 150 (FIG. 5) formed between the arcuate sections 80 and 88 of the rear frame section 42 and front frame section 44. The opening 150 accommodates a drive shaft for the hub 26 (FIG. 2) connected with the front wheel 14 (FIG. 1) of the vehicle. Centers of curvature of the arcuate sections 80 and 88 (FIG. 5) of the frame sections 42 and 44 are disposed in the opening 150.

The upper wheel mounting section 110 is supported directly above the lower pivot mounting section 68 with the opening 138 in the upper wheel mounting section aligned with the opening 126 in the lower pivot mounting section (FIG. 5). The lower pivot mounting section 68 is fixedly connected (welded) to the lower end portions 64 and 66 of the rear frame section 42 and front frame section 44. The upper wheel pivot mounting 110 is supported by the arm 106 of the reinforcing member 94 (FIG. 6) and by the support member 114.

When the wheel mounting section 24 is to be connected with the carrying assembly 22, the pin 124 on the wheel mounting section (FIG. 4) is inserted into the opening 126 (FIGS. 4 and 5) in the lower pivot mounting is section 68. As this is done, the flange 132 (FIG. 4) on the wheel mounting section 24 is moved beneath the upper wheel pivot mounting section 110. This aligns the opening 142 in the flange 132 with the opening 138 in the upper wheel pivot mounting section 110.

The flange 132 on the wheel mounting section 24 and the upper wheel pivot mounting section 110 are interconnected by inserting the ball joint assembly 130 into the opening 138 in the upper wheel mounting section and into the opening 142 in the flange on the wheel mounting section. The ball joint housing 136 is fixedly connected with the upper wheel pivot mounting section 110. The shank portion 140 of the ball joint assembly 130 extends into the opening 142 in the wheel mounting section 24. A suitable nut or other fastener is then connected with the shank portion of the ball joint assembly 130 to secure the connection between the wheel mounting section 24 and the upper wheel pivot mounting section 110.

The wheel suspension assembly 20 illustrated in FIGS. 2–6 is intended for use in association with the front wheel 14 of the vehicle 10. The front wheel 14 is driven by a drive shaft (not shown) which extends through the opening 150 (FIG. 5) between the rear frame section 42 and front frame section 44. The drive shaft engages the internally splined drive section 28 (FIG. 2) of the hub 26 to rotate the wheel 14. When the wheel 14 is to be turned, the steering system applies force to the arm 38 of the wheel mounting section 24 to pivot the wheel mounting section about the steering axis 36.

If the front wheel 14 of the vehicle encounters a bump in the road, the front wheel moves upward (as view in FIG. 1) relative to the body 12 of the vehicle. As this occurs, the entire wheel suspension assembly 20 moves upward. As the wheel suspension assembly 20 moves upward, the carrying assembly 22 pivots relative to other components of the vehicle about the mounting axes 60 and 72 (FIG. 2). Thus, pivotal movement occurs between the carrying assembly 22 and components of the vehicle 10, such as an upper control arm, connected with the upper pivot mounting section 48. At the same time, pivotal movement occurs between the carrying assembly 22 and components of the vehicle 10, such as a lower control arm, connected with the lower pivot mounting section 68.

The hollow hydroformed rear frame section 42 and the hollow hydroformed front frame section 44 are relatively light and strong. This minimizes the weight and the inertia of the carrying assembly 22. In addition, the hollow hydroformed construction of the rear frame section 42 and the front frame section 44 enables the carrying assembly 22 to withstand forces transmitted from the front wheel 14 to the carrying assembly through the wheel mounting section 24.

During steering movement of the front wheel 14 relative to the body 14 of the vehicle 10, the rear frame section 42 and front frame section 44 do not pivot relative to the body of the vehicle about an axis corresponding to the steering axis 36 (FIG. 2). However, it is contemplated that the rear frame section 42 and front frame section 44 could be mounted so as to pivot together about an axis corresponding to the steering axis 36. If this is done, the hub 26 could be mounted directly on the rear frame section 42 and front frame section 44. This would result in the wheel mounting section 24 being eliminated.

The rear frame section 42 and front frame section 44 form a base on which other components of the suspension assembly 20 are mounted. In the embodiment of FIGS. 2 and 3, the wheel mounting section 24 is movable on the frame sections 42 and 44. However, the carrying assembly 22 and wheel mounting section 24 could be constructed in such a manner as to become a functional unit. This could be accomplished by fixedly connecting the wheel mounting section 24 with the frame sections 42 and 44. If this was done, the frame sections 42 and 44 would be connected with other components of the vehicle 10 in such a manner as to accommodate turning movement of a steerable vehicle wheel.

The rear and front frame sections 42 and 44 form columns on which many different suspension components may be mounted. This enables the suspension assembly 20 to be modified to accommodate different types of suspensions in different vehicles.

It is contemplated that the upper pivot mounting section 48 and the lower pivot mounting section 68 could be replaced by pivot mountings which would accommodate pivotal movement of the rear frame section 42 and front frame section 44 about an axis corresponding to the steering axis 36 of FIG. 2 and the mounting axes 60 and 72. This could be accomplished by utilizing a ball joint assembly, similar to the ball joint assembly 130 of FIG. 4, at the upper pivot mounting section 48. Similarly, a ball joint assembly would be provide at the lower pivot mounting section 68. These ball joint assemblies would be connected with other vehicle components to accommodate up and down movement of the rear frame section 42 and front frame section 44. These ball joint assemblies would also accommodate turning movement of the rear frame section 42 and front frame section 44 about a steering axis.

In the embodiment of the invention illustrated in FIGS. 2–6, the wheel suspension assembly 20 has been adapted for mounting in association with a front wheel 14 of a vehicle. The front wheel 14 is driven and is steerable. It is contemplated that the carrying assembly 22 could be associated with a front wheel of a vehicle in which only the rear wheels 16 are driven. If this was done, the rear frame section 42 and front frame section 44 could be formed without the arcuate sections 80 and 88. This is because the front wheel is not driven and it is not necessary to provide space to enable a drive shaft to extend through the carrying assembly 22 into engagement with the hub 26. When the arcuate sections 80 and 88 are omitted, rear frame section 42 and front frame section 44 would be relatively straight and extend between the lower end portions 64 and 66 and the upper end portions 50 and 52 of the rear and front frame sections 42 and 44.

In the foregoing description, the wheel suspension assembly 20 has been described as being associated with a front wheel 14 of the vehicle 10. However, it is contemplated that the wheel suspension assembly 20 could be associated with the rear wheel 16 of the vehicle 10. Since the rear wheels of the vehicle 10 are not used for steering functions, the wheel mounting section 24 does not have to be pivotal relative to the rear frame section 42 and front frame section 44 of the carrying assembly 22. Therefore, a wheel mounting section for a hub or portion of an axle connected with the rear wheels 16 would not have to be pivotal about the steering axis 36. The wheel mounting section 24 could be integrally formed as one piece with the lower pivot mounting section 68. The arm 106 of the reinforcing member 94 and the support member 114 would be fixedly connected with a flange, corresponding with the flange 132 of FIG. 4, on the wheel mounting section.

From the above description of the invention, those skilled in the art will perceive improvement, changes and modifications. Such improvements, changes and modifications within the skill of the art are intended to be covered by the appended claims.

Having described the invention, the following is claimed:

1. An assembly for use in a vehicle suspension system for a steerable wheel, said assembly comprising:

a first hollow hydroformed section;

a second hollow hydroformed section which is connected with said first hollow hydroformed section;

upper and lower pivot mountings connected with said first and second hollow hydroformed sections;

a wheel mounting section which is pivotally connected with said upper and lower pivot mountings and is connectable with the steerable wheel, said wheel mounting section being pivotal at said upper and lower pivot mountings to accommodate turning movement of the steerable wheel; and a reinforcing member extending between said first and second hollow hydroformed sections at a location between end portions of said first and second hollow hydroformed sections, said reinforcing member having a mounting section which extends transverse to an axis about which said wheel mounting section is pivotal relative to said upper and lower pivot mountings, said mounting section of said reinforcing member being connected to said upper pivot mounting.

2. An assembly as set forth in claim 1 wherein said first hollow hydroformed section is formed from a first tubular member and said second hollow hydroformed section is formed from a second tubular member, said assembly further including an upper mounting section extending between and connected to upper end portions of said first and second hollow hydroformed sections and a lower mounting section extending between and connected to lower end portions of said first and second hollow hydroformed sections.

3. An assembly as set forth in claim 1 wherein said upper pivot mounting is connected with said first hollow hydroformed section at a location between said upper and lower end portions of said first hollow hydroformed section and is connected with said second hollow hydroformed section at a location between said upper and lower end portions of said second hollow hydroformed section.

4. An assembly as set forth in claim 1 wherein said lower pivot mounting is connected with lower end portions of said first and second hollow hydroformed sections and said upper pivot mounting is connected with said first and second hollow hydroformed sections at locations disposed between said upper and lower end portions of said first and second hollow hydroformed sections.

5. An assembly as set forth in claim 1 wherein said first hollow hydroformed section has a first arcuate section disposed between locations where said upper and lower pivot mountings are connected with said first hollow hydroformed section, said second hollow hydroformed section has a second arcuate section disposed between locations where said upper and lower pivot mounting are connected with said second hollow hydroformed section, said first and second arcuate sections have centers of curvature which are disposed between said first and second hollow hydroformed sections to enable a drive shaft to extend between said first and second hollow hydroformed sections into engagement with the steerable wheel.

6. An assembly as set forth in claim 1 wherein said first hollow hydroformed section includes a main portion which is offset from and extends along an axis about which said wheel mounting section is pivotal, said first hollow hydroformed section includes upper and lower arm portions which extend from said main portion in a direction toward the axis about which said wheel mounting section is pivotal, said second hollow hydroformed section includes a main portion which is offset from and extends along the axis about which said wheel mounting section is pivotal, said second hollow hydroformed section includes upper and lower arm portions which extend from said main portion of said second hollow hydroformed section in a direction toward the axis about which said wheel mounting section is pivotal, said upper arm portions of said first and second hollow hydroformed sections being connected with an upper mounting section which supports said first and second hydroformed sections for pivotal movement about an upper axis which extends transverse to the axis about which said wheel mounting section is pivotal, said lower arm portions of said first and second hollow hydroformed sections being connected with said lower pivot mounting.

7. An assembly as set forth in claim 6 wherein said main portions of said first and second hollow hydroformed sections have rectangular cross sectional configurations as viewed in a plane extending perpendicular to the axis about which said wheel mounting section is pivotal.

8. An assembly as set forth in claim 1 wherein said first hollow hydroformed section is integrally formed as one piece from a first metal tube, said second hollow hydroformed section is integrally formed as one piece from a second metal tube, said lower pivot mounting includes a one piece metal member which is connected with end portions of said first and second hollow hydroformed sections, said upper pivot mounting includes a one piece metal member which is connected with portions of said first and second hollow hydroformed sections at locations disposed between opposite end portions of said first and second hollow hydroformed sections.

9. An assembly as set forth in claim 8 wherein said upper pivot mounting includes a ball joint assembly which extends between said one piece metal member of said upper pivot mounting and said wheel mounting section.

10. An assembly for use in a vehicle suspension system for a steerable wheel, said assembly comprising:
 a first hollow hydroformed section;
 a second hollow hydroformed section which is connected with said first hollow hydroformed section;
 upper and lower pivot mountings connected with said first and second hollow hydroformed sections;
 a wheel mounting section which is pivotally connected with said upper and lower pivot mountings and is connectable with the steerable wheel, said wheel mounting section being pivotal at said upper and lower pivot mountings to accommodate turning movement of the steerable wheel; and
 a reinforcing member extending between said first and second hollow hydroformed sections at a location between end portions of said first and second hollow hydroformed sections, said reinforcing member having a mounting section which extends transverse to an axis about which said wheel mounting section is pivotal relative to said upper and lower pivot mountings, said mounting section of said reinforcing member being connected to said upper pivot mounting; and
 a support member extending between said first and second hollow hydroformed sections at a location between said upper and lower pivot mountings, said support member having a mounting section which extends transverse to an axis about which said wheel mounting section is pivotal relative to said upper and lower pivot mountings, said mounting section of said support member being connected to said upper pivot mounting.

11. An assembly for use in a vehicle suspension system for a steerable wheel, said assembly comprising:
 a first hollow hydroformed section;
 a second hollow hydroformed section which is connected with said first hollow hydroformed section;
 upper and lower pivot mountings connected with said first and second hollow hydroformed sections;
 a wheel mounting section which is pivotally connected with said upper and lower pivot mountings and is connectable with the steerable wheel, said wheel mounting section being pivotal at said upper and lower pivot mountings to accommodate turning movement of the steerable wheel;
 said first hollow hydroformed section includes a main portion which is offset from and extends along an axis about which said wheel mounting section is pivotal, said first hollow hydroformed section includes upper and lower arm portions which extend from said main portion in a direction toward the axis about which said wheel mounting section is pivotal, said second hollow hydroformed section includes a main portion which is offset from and extends along the axis about which said wheel mounting section is pivotal, said second hollow hydroformed section includes upper and lower arm portions which extend from said main portion of said second hollow hydroformed section in a direction toward the axis about which said wheel mounting section is pivotal,
 said upper arm portions of said first and second hollow hydroformed sections being connected with an upper mounting section which supports said first and second hydroformed sections for a pivotal movement about an upper axis which extends transverse to the axis about which said wheel mounting section is pivotal, said lower arm portions of said first and second hollow hydroformed sections being connected with said lower pivot mounting, said upper pivot mounting being connected with said main portions of said first and second hollow hydroformed sections.

12. An assembly as set forth in claim 11 wherein said main portions of said first and second hollow hydroformed sections have rectangular cross sectional configurations as viewed in a plane extending perpendicular to the axis about which said wheel mounting section is pivotal.

13. An assembly as set forth in claim 11 wherein said first hollow hydroformed section is integrally formed as one piece from a first metal tube, said second hollow hydroformed section is integrally formed as one piece from a second metal tube, said lower pivot mounting includes a one piece metal member which is connected with end portions of said first and second hollow hydroformed sections, said upper pivot mounting includes a one piece metal member which is connected with portions of said first and second hollow hydroformed sections at locations disposed between opposite end portions of said first and second hollow hydroformed sections.

14. An assembly as set forth in claim 11 wherein said first hollow hydroformed section is formed from a first tubular member and said second hollow hydroformed section is formed from a second tubular member.

15. An assembly as set forth in claim 11 wherein said upper pivot mounting is connected with said first hollow hydroformed section at a location between said upper and lower arm portions of said first hollow hydroformed section and is connected with said second hollow hydroformed section at a location between said upper and lower arm portions of said second hollow hydroformed section.

16. An assembly for use in a vehicle suspension system for a steerable wheel, said assembly comprising:

a first hollow hydroformed section;

a second hollow hydroformed section which is connected with said first hollow hydroformed section;

upper and lower pivot mountings connected with said first and second hollow hydroformed sections;

a wheel mounting section which is pivotally connected with said upper and lower pivot mountings and is connectable with the steerable wheel, said wheel mounting section being pivotal at said upper and lower pivot mountings to accommodate turning movement of the steerable wheel;

said first hollow hydroformed section is integrally formed as one piece from a first metal tube;

said second hollow hydroformed section is integrally formed as one piece from a second metal tube;

said lower pivot mounting includes a one piece cast metal member which is connected with end portions of said first and second hollow hydroformed sections;

said upper pivot mounting includes a one piece cast metal member which is connected with portions of said first and second hollow hydroformed sections at locations disposed between opposite end portions of said first and second hollow hydroformed sections.

17. An assembly as set forth in claim 16 further including an upper mounting section connected with upper end portions of said first and second hollow hydroformed sections to support said first and second hollow hydroformed sections for pivotal movement about an upper axis which extends transverse to an axis about which said wheel mounting section is pivotal and a lower mounting section connected with lower end portions of said first and second hollow hydroformed sections to support said first and second hollow hydroformed sections for pivotal movement about a lower axis which extends transverse to the axis about which said wheel mounting section is pivotal.

18. An assembly as set forth in claim 16 further including an upper mounting section extending between and connected to upper end portions of said first and second hollow hydroformed sections and a lower mounting section extending between and connected to lower end portions of said first and second hollow hydroformed sections.

19. An assembly as set forth in claim 16 wherein said first hollow hydroformed section has a first arcuate section disposed between locations where said upper and lower pivot mountings are connected with said first hollow hydroformed section, said second hollow hydroformed section has a second arcuate section disposed between locations where said upper and lower pivot mounting are connected with said second hollow hydroformed section, said first and second arcuate sections have centers of curvature which are disposed between said first and second hollow hydroformed sections to enable a drive shaft to extend between said first and second hollow hydroformed sections into engagement with the steerable wheel.

20. An assembly as set forth in claim 16 further including a reinforcing member extending between said first and second hollow hydroformed sections at a location between end portions of said first and second hollow hydroformed sections.

21. An assembly as set forth in claim 16 further including a support member extending between said first and second hollow hydroformed sections at a location between said upper and lower pivot mountings, said support member being connected to said upper pivot mounting.

22. An assembly as set forth in claim 16 wherein said first hollow hydroformed section includes a main portion which is offset from and extends along an axis about which said wheel mounting section is pivotal, said first hollow hydroformed section includes upper and lower arm portions which extend from said main portion in a direction toward the axis about which said wheel mounting section is pivotal, said second hollow hydroformed section includes a main portion which is offset from and extends along the axis about which said wheel mounting section is pivotal, said second hollow hydroformed section includes upper and lower arm portions which extend from said main portion of said second hollow hydroformed section in a direction toward the axis about which said wheel mounting section is pivotal.

23. An assembly as set forth in claim 22 wherein said main portions of said first and second hollow hydroformed sections have rectangular cross sectional configurations as viewed in a plane extending perpendicular to the axis about which said wheel mounting section is pivotal.

24. An assembly as set forth in claim 16 wherein said upper pivot mounting includes a ball joint assembly which extends between said one piece cast member of said upper pivot mounting and said wheel mounting section.

25. An assembly for use in a vehicle suspension system for a steerable wheel, said assembly comprising:

a wheel mounting section which is connectable with the steerable wheel and is pivotal about a pivot axis to accommodate turning movement of the steerable wheel;

a first hollow hydroformed section, said first hollow hydroformed section is formed from a first tubular member and includes a main portion which is offset from and extends along the axis about which said wheel mounting section is pivotal;

a second hollow hydroformed section, said second hollow hydroformed section is formed from a second tubular member and includes a main portion which is offset from and extends along the axis about which said wheel mounting section is pivotal;

an upper mounting section which is connected with upper end portions of said first and second hollow hydroformed sections and supports said first and second hollow hydroformed sections for pivotal movement about an upper axis which extends transverse to the axis about which said wheel mounting section is pivotal;

a lower mounting section which is connected with lower end portions of said first and second hollow hydroformed sections and supports said first and second hollow hydroformed sections for pivotal movement about a lower axis which extends transverse to the axis about which said wheel mounting section is pivotal;

an upper pivot mounting connected With said main portion of said first hollow hydroformed section, said main portion of said second hollow hydroformed section, and said wheel mounting section to support said wheel mounting section for movement about the axis which said wheel mounting section is pivotal; and a lower pivot mounting connected with said first hollow hydroformed section, said second hollow hydroformed section, and said wheel mounting section to support said wheel mounting section for movement about the axis which said wheel mounting section is pivotal.

26. An assembly as set forth in claim 25 wherein said main portion of said first hollow hydroformed section has a first arcuate section disposed between locations where said upper and lower pivot mountings are connected with said first hollow hydroformed section, said main portion of said second hollow hydroformed section has a second arcuate section disposed between locations where said upper and lower pivot mounting are connected with said second hollow hydroformed section, said first and second arcuate sections enable a drive shaft to extend between said first and second hollow hydroformed sections into engagement with the steerable wheel.

27. An assembly as set forth in claim 25 further includes a reinforcing member extending between said main portions of first and second hollow hydroformed sections, said reinforcing member having a mounting section which extends transverse to an axis about which said wheel mounting section is pivotal relative to said upper and lower pivot mountings, said mounting section of said reinforcing member being connected to said upper pivot mounting.

28. An assembly as set forth in claim 25 further including a support member extending between said main portion of said first and second hollow hydroformed sections, said support member having a mounting section which is connected to said upper pivot mounting.

29. An assembly as set forth in claim 25 wherein said first hollow hydroformed section includes upper and lower arm portions which extend from said main portion of said first hollow hydroformed section in a direction toward the axis about which said wheel mounting section is pivotal, said second hollow hydroformed section includes upper and lower arm portions which extend from said main portion of said second hollow hydroformed section in a direction toward the axis about which said wheel mounting section is pivotal, said upper arm portions of said first and second hollow hydroformed sections being connected with said upper mounting section, said lower arm portions of said first and second hollow hydroformed sections being connected with said lower pivot mounting.

30. An assembly as set forth in claim 25 wherein said main portions of said first and second hollow hydroformed sections have rectangular cross sectional configurations as viewed in a plane extending perpendicular to the axis about which said wheel mounting section is pivotal.

31. An assembly as set forth in claim 25 wherein said upper pivot mounting includes a ball joint assembly.

\* \* \* \* \*